United States Patent [19]

Harris et al.

[11] Patent Number: 5,494,357
[45] Date of Patent: Feb. 27, 1996

[54] PROCESS FOR MAKING A REPLACEABLE SOCKET FOR A BALL AND SOCKET BEARING AND THE REPLACEMENT SOCKET MADE THEREBY

[75] Inventors: Bernard Harris, Northbrook; Dennis E. Bozych, Downers Grove, both of Ill.

[73] Assignee: Rexnord Corporation, Milwaukee, Wis.

[21] Appl. No.: 326,055

[22] Filed: Oct. 19, 1994

Related U.S. Application Data

[63] Continuation of Ser. No. 960,014, Oct. 13, 1992, abandoned.

[51] Int. Cl.$^6$ ..................................................... F16C 25/04
[52] U.S. Cl. .......................... 384/208; 384/908; 384/909
[58] Field of Search ..................................... 384/208, 206, 384/207, 203, 204, 300, 298, 908, 909

[56] References Cited

U.S. PATENT DOCUMENTS

| | | | |
|---|---|---|---|
| 2,346,564 | 4/1944 | Allen | 384/208 |
| 3,371,398 | 3/1968 | Patterson et al. | 29/149.5 |
| 3,616,000 | 10/1971 | Butzow et al. | 156/173 |
| 3,697,346 | 10/1972 | Van Dorn et al. | 156/161 |
| 3,700,295 | 10/1972 | Butzow et al. . | |
| 3,713,932 | 1/1973 | Butzow et al. | 156/173 |
| 3,804,479 | 4/1974 | Butzow et al. . | |
| 3,934,954 | 1/1976 | McCloskey . | |
| 3,974,009 | 8/1976 | Butzow et al. | 156/84 |
| 3,998,504 | 12/1976 | McCloskey . | |
| 4,411,545 | 10/1983 | Roberge | 384/208 |
| 5,005,991 | 4/1991 | Heumann et al. | 384/208 |

Primary Examiner—Lenard A. Footland
Attorney, Agent, or Firm—Michael, Best & Friedrich

[57] ABSTRACT

A process for making a replaceable socket having a body portion with a concave internal raceway and insertion slot structure to allow installation and removal of a spherical bearing and the replaceable socket made by that process. The process includes the steps of providing a mandrel; providing a removable core assembly that includes a cylindrical core axially truncated to have opposed arcuate surfaces conforming to the insertion slot structure and spaced apart ends, and a truncated spherical core having an open diametrically extending slot dimensioned to removably receive one of the cylindrical core ends therein when assembled and a spherical surface in conformity with the spherical bearing to be installed in the socket; mounting the core assembly on the mandrel; applying a parting agent to the core assembly; applying an overlayment onto the core assembly; applying a hardenable liquid to coat and bond the overlayment and fill any interstices that exist; hardening the liquid to form a unitary member having an outer surface; removing excess overlayment from the unitary member to provide the socket with a finished periphery and ends; removing the core assembly with the finished socket thereon from the mandrel; withdrawing the cylindrical core axially from one of the finished ends to expose the insertion slots in the socket; and rotating the truncated spherical core within the replaceable race and withdrawing same through the exposed insertion slots to expose the concave raceway within the socket.

17 Claims, 4 Drawing Sheets

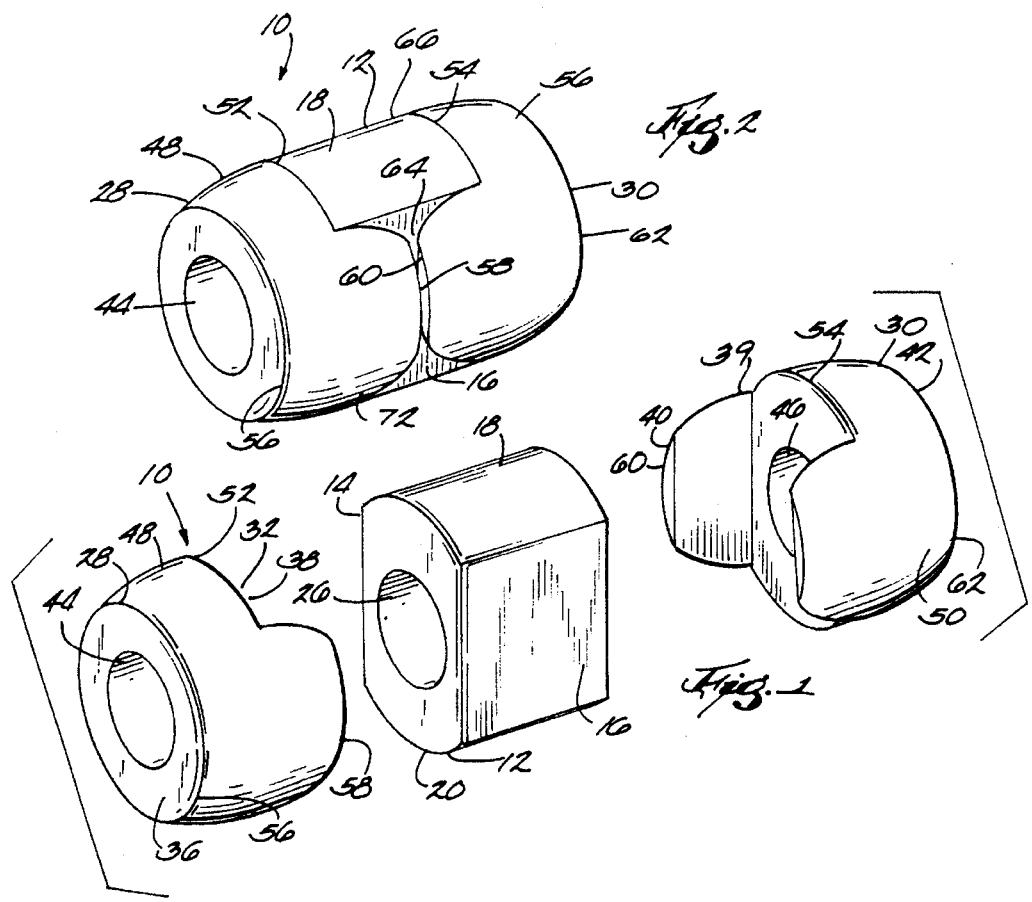
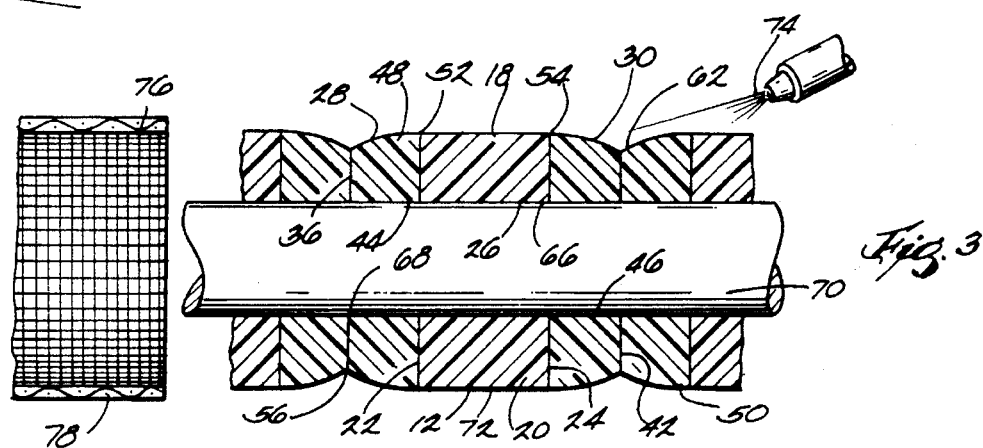
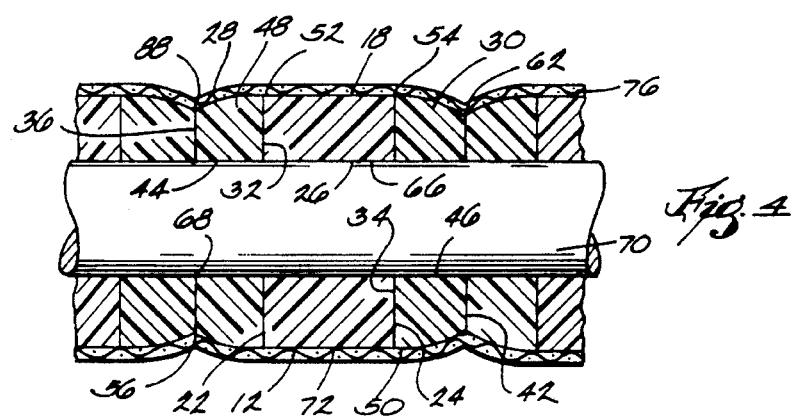

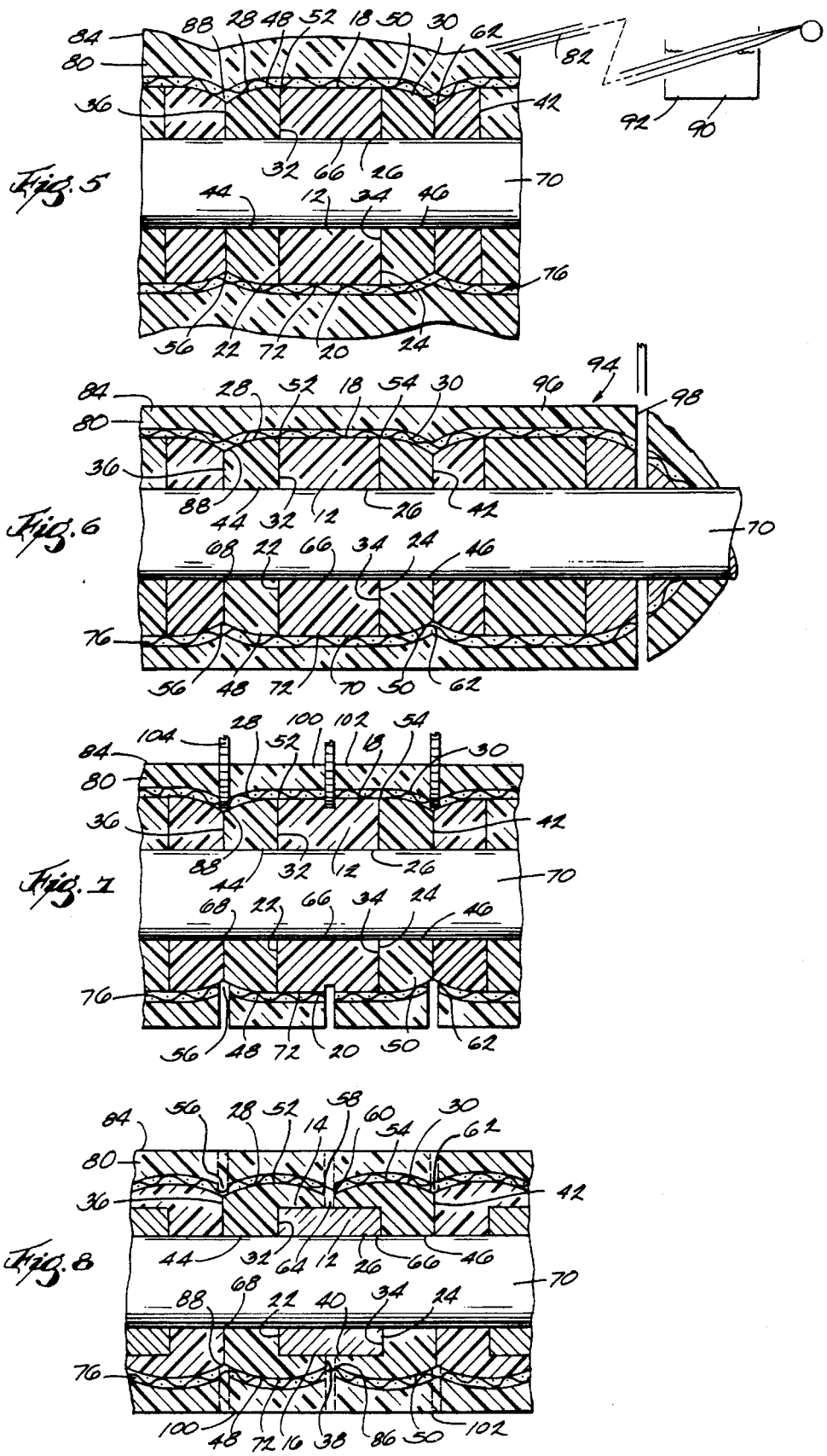

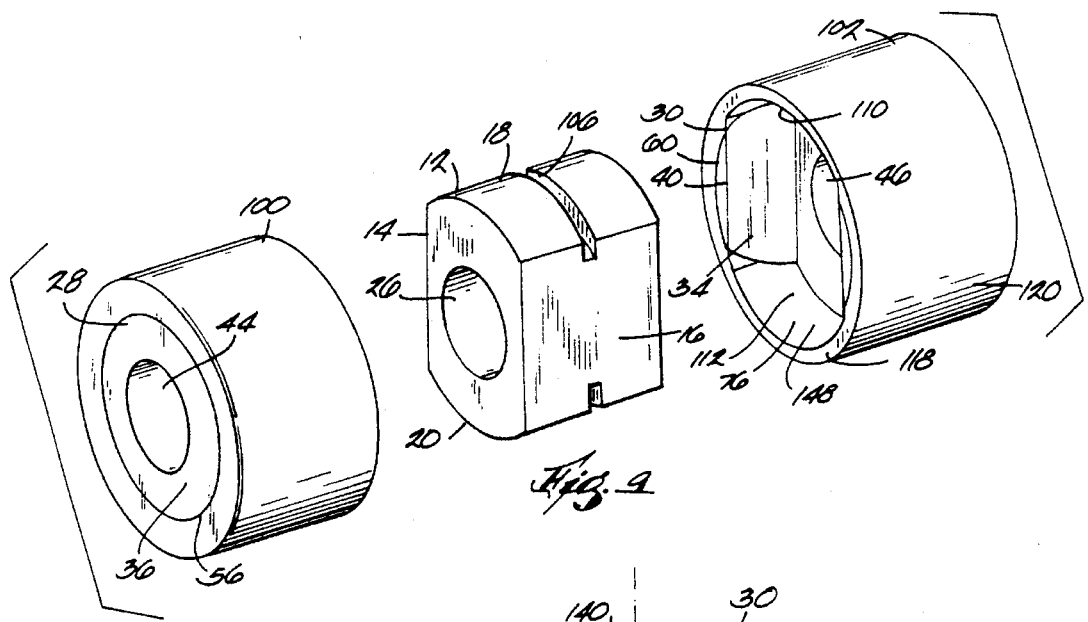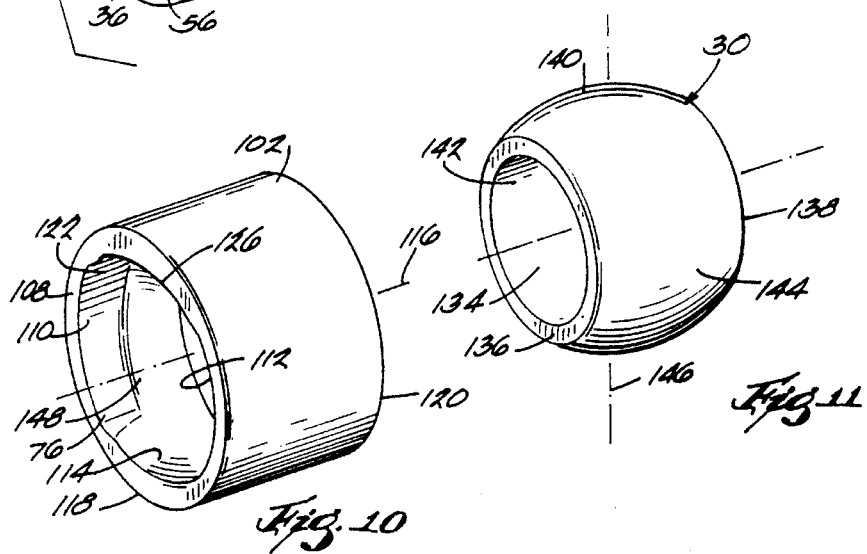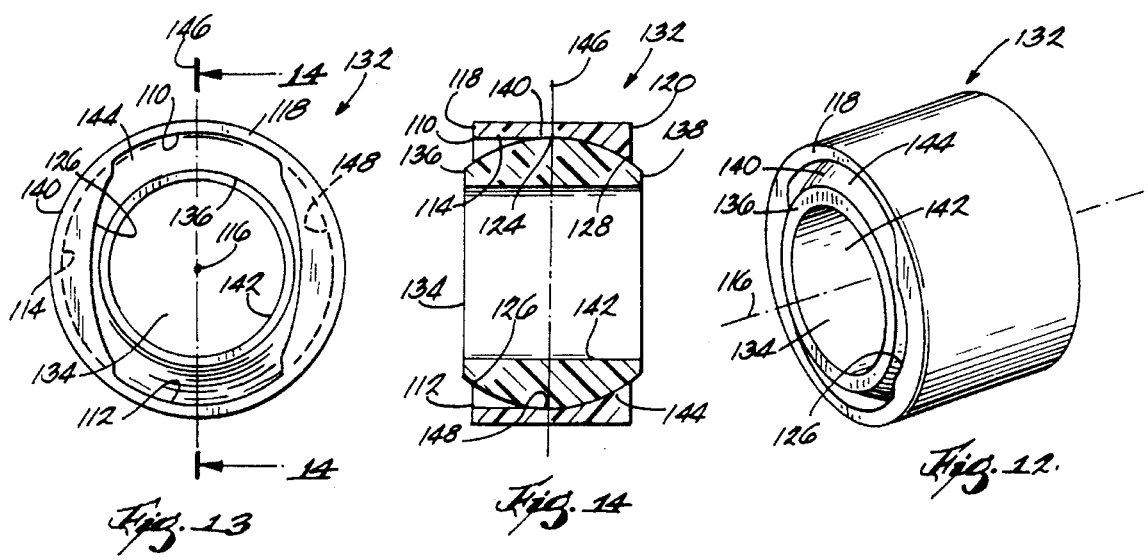

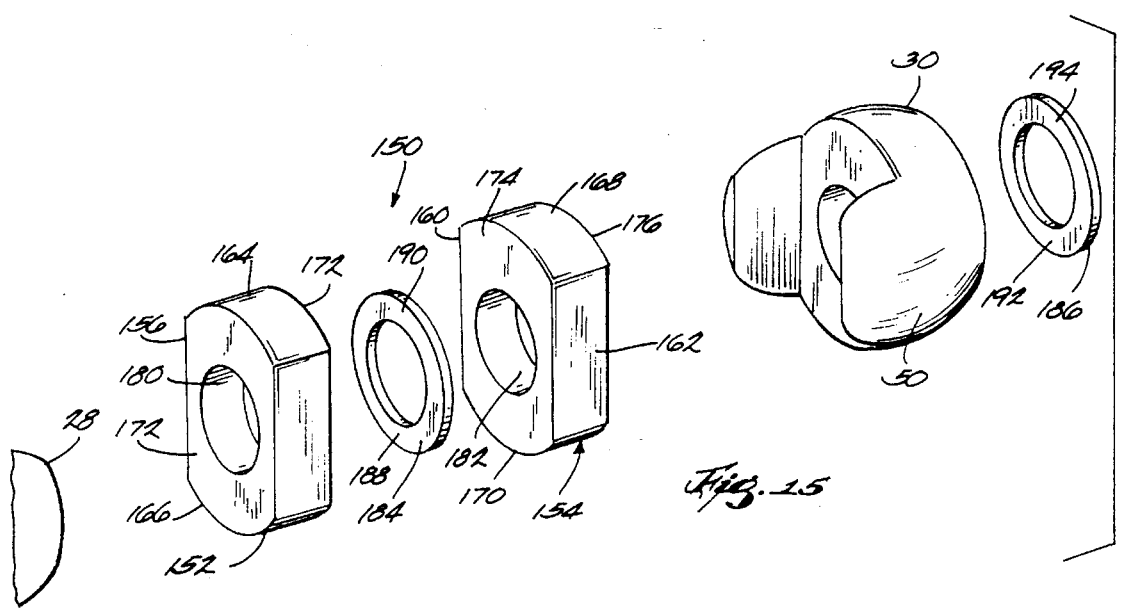
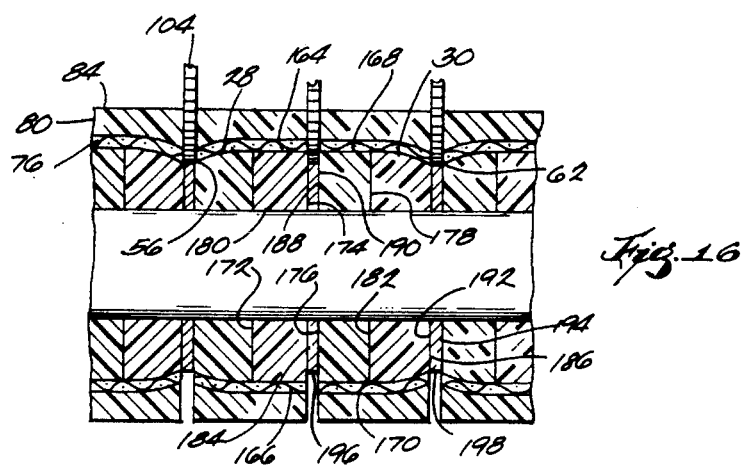
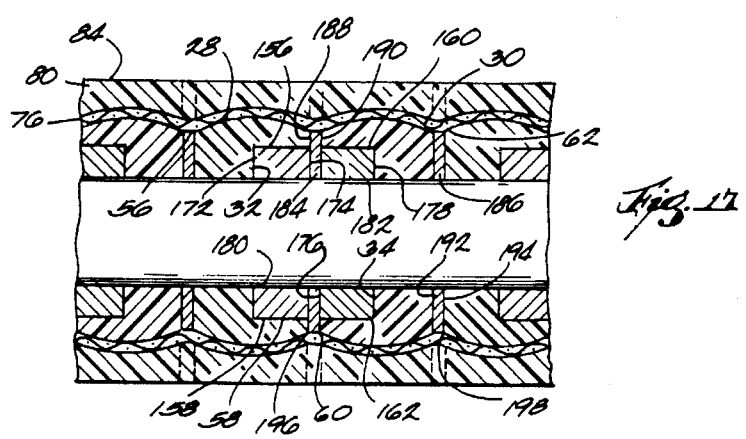

PROCESS FOR MAKING A REPLACEABLE SOCKET FOR A BALL AND SOCKET BEARING AND THE REPLACEMENT SOCKET MADE THEREBY

This application is a continuation of Ser. No. 07/960,014, filed Oct. 13, 1992, now abandoned.

BACKGROUND OF THE INVENTION

This invention relates to composite bearings, and, more particularly, to an improved composite ball and socket bearing having a replaceable outer socket.

Ball and socket bearings are designed for applications where both misaligning and oscillatory motions are present. These bearings are sometimes referred to as self-aligning bearings, and typically comprise a bearing with a spherical outer diameter, referred to as the ball, mounted within an opening, or the socket, of a housing, thus forming the ball and socket bearing. For convenient reference, the term "socket" will be used to refer to the socket and its housing. The socket comprises a concave internal surface or raceway that is integral with the housing. The socket internal raceway and the outer spherical diameter of the ball must have a predetermined close tolerance fit to assure consistent bearing performance and long life.

The close tolerance fit between the ball outer surface and the socket internal raceway can be assured by permanently mounting the spherical ball in the internal raceway of the socket, thus producing a unitary ball and socket bearing which can be tested for the desired predetermined close tolerance fit as a final step before marketing. Many such bearings are known having metallic sockets permanently forged or otherwise formed onto metallic balls to form a unitary ball and socket bearing. Such unitary ball and socket bearings are difficult and expensive to manufacture, and there is always a risk of the steps of forming the final assembly causing damage to either the ball outer surface or the socket internal raceway, which would adversely affect the close tolerance fit of the bearing interface. Further with this design the ball alone is not replaceable and therefor when replacement is required the entire unitary ball and socket bearing must be replaced which means that it is not practical to permanently mount the metallic socket. Such a combination of a ball and a permanently affixed socket will be referred to as a replaceable bearing subassembly because it is usually designed to be replaceably mounted as a unit within a separate outer housing or pillow block, which can be permanently mounted.

It is often desirable, however, that either the ball or the socket be individually replaceable as they wear, or as the application requirements for the bearing change, and so the ball is also often designed to be removable from the socket. This type of bearing will be referred to as a removable ball and socket bearing. Such a removable ball and socket bearing is shown in U.S. Pat. No. 3,116,539, J. R. Evans et al. issued Jan. 7, 1964, which discloses a socket having insertion slots diametrically spaced apart on one side of the socket, permitting insertion of the ball into the internal socket raceway. The ball is inserted sideways through the insertion slots and turned ninety degrees to seat the spherical outer diameter or surface of the ball within the socket raceway, making the ball easily removable from the socket. The socket may then be permanently mounted and the ball replaced as necessary, or, conversely the socket may be temporarily mounted so that the ball or the socket, but not necessarily both, can be replaced.

Generally such metallic sockets are produced by swaging or otherwise forming a malleable metallic socket to conform to the surface of the metal ball. The problem with such processing steps is that the socket may be weakened, or the outer surface of the ball or the raceway of the socket damaged, which will have adverse consequence on the wear rate for the bearing. In addition, the insertion slots must be machined or formed in the socket. The insertion slots reduce the surface area of the concave internal raceway, and must be carefully generated in manufacture to avoid producing irregularities in the internal raceway surface which might lead to increased wear.

A different type of replaceable bearing subassembly is disclosed in U.S. Pat. Nos. 3,700,295 and 3,974,009, both issued to Butzow et al., on Oct. 24, 1972 and Aug. 10, 1976, respectively. This replaceable bearing subassembly comprises a resin-impregnated filament-wound annular socket having a concave internal raceway and a corrosion resistant spherical steel ball which will be referred to as a composite replaceable bearing subassembly. This combination provides a composite, lightweight, corrosion-resistant replaceable bearing subassembly. This composite replaceable bearing subassembly also has a self-lubricating surface of a low friction material, such as a woven Teflon fabric, on the internal raceway of the annular socket, and is produced by a process comprising applying the fabric over the spherical steel bearing assembled on a mandrel and then building up the body of the socket member over the fabric by repeatedly winding resin-impregnated fiberglass filaments about the fabric. The resulting resinous body is subsequently cured to harden the resin. The internal raceway surface thus comprises a layer of Teflon fabric, which forms a low friction bearing surface against the outer surface of the steel ball. This process of producing a composite replaceable bearing subassembly provides the desired close tolerance fit between the outer spherical diameter of the ball and the socket internal raceway, and avoids the disadvantages of the difficult forming or forging steps previously discussed. With a fiberglass socket formed over a steel ball in this fashion, a composite replaceable bearing subassembly is produced which is lighter, less expensive and easier to manufacture than a replaceable bearing subassembly having a metallic socket member formed over a metallic ball.

A lightweight composite replaceable bearing subassembly having a fiberglass socket is strong relative to other lightweight, non-metallic materials. However, if a composite replaceable bearing subassembly is to be provided with insertion slots to make either the ball or socket replaceable, the insertion slots must still be machined into the socket, such as by grinding or milling. Because a fiberglass socket is not malleable such a socket cannot be formed over the ball by conventional forming or swaging methods. Slots must be cut into the body of a fiberglass socket member with great care to avoid damaging the socket, such as by stress fractures or chipping, and also to avoid marring the surface of the internal raceway. Thus the process for producing a replaceable fiberglass socket member of a ball and socket bearing is time consuming, labor intensive and results in more waste, raising the cost of producing such a socket member.

If the internal raceway of the bearing outer socket is lined with a low friction Teflon fabric, machining of the insertion slots will create serious disadvantages. Machining or cutting away low friction fabric from the internal raceway to create the insertion slots, which results in part of the raceway being not covered by low friction fabric and also results in frayed fabric on the raceway surface, decreases the life of the bearing. The insertion slots constitute high friction areas in the raceway which decrease the frictionless nature of that surface.

Therefore, in spite of extensive development in the bearing art, a need exists for a simple, low cost process for producing a composite removable ball and socket bearing wherein insertion slots are formed in the socket during manufacture to eliminate the need for machining or cutting into the socket after it has been formed and, if desired, for lining the socket raceway and insertion slots with a self-lubricating material. A need also exists for a removable ball and socket bearing having both the raceway and the insertion slots lined with a self-lubricating material.

SUMMARY OF THE INVENTION

The primary object of the invention is to provide an improved process for manufacturing insertion slot means within the outer socket of a ball and socket bearing.

A more specific object is to provide such a process which allows the socket to be simply and inexpensively manufactured by use of a core assembly having separable components.

Another object is to provide a socket having insertion slot means whereby the internal raceway and insertion slot means is seamlessly lined by self-lubricating fabric.

The achievement of these and other objects is provided by the process of the invention. The process produces a replaceable socket of the type that has a concave internal raceway and insertion slot means to allow installation and removal of a spherical bearing therein. The process initially comprises the steps of providing a mandrel and a special removable core assembly mounted on the mandrel. The core assembly includes a cylindrical core axially truncated to have opposed arcuate surfaces conforming to the insertion slot means, and spaced apart ends. The core assembly also includes a truncated spherical core having an open diametrically extending slot dimensioned to removably receive one of the cylindrical core ends therein when assembled and a spherical surface in conformity with the spherical bearing to be installed in the inner raceway of the finished socket.

The core assembly preferably includes a plurality of removable core assemblies each of which includes axially aligned first and second spherical cores divided by a first parting interface and positioned to place their respective slots in confronting relation to create a double depth slot. The truncated cylindrical core is dimensioned to be removably mounted in the double depth slot. The plurality of removable core assemblies are each axially aligned relative to other core assemblies on the mandrel with a second parting interface between adjacent assemblies. When using the plurality of core assemblies the process produces a plurality of replaceable sockets.

A parting agent is applied to the core assemblies and an overlayment is applied to form the bearing socket. The overlayment preferably comprises a plurality of filaments wound under tension over the core assembly or the plurality of core assemblies. A layer of self-lubricating conformable material may be applied onto the removable core assembly prior to the overlayment, so that the overlayment is applied on top of the layer of self-lubricating material to cause the layer to conform to the core assembly. The layer of self-lubricating material may include self-lubricating and shrinkable materials, and the process may include shrinking the layer of self-lubricating and shrinkable materials after their application to the core assembly.

A hardenable liquid, or resin is applied to coat and bond the overlayment and fill any interstices that exist. The overlayment and hardenable resin can be applied together simultaneously by resin-impregnating the filaments as they are wound onto the core assembly. The hardenable resin of the overlayment is then hardened to form a unitary member including the plurality of removable core assemblies. Excess overlayment is then removed from the unitary member to provide finished periphery and ends.

Radial plane cutting of the elongated unitary member at the first and second parting interfaces is used to form a plurality of individual races from the hardened overlayment. The finished sockets with core assemblies therein are removed from the mandrel and the cylindrical core is then withdrawn axially, which exposes the installation slots in the socket. The truncated spherical core is rotated within the socket and withdrawn through the exposed installation slots to expose the concave raceway within the socket. If the process includes applying the layer of self-lubricating conformable material onto the removable core assembly prior to application of the overlayment, the exposed installation slots and the exposed concave raceway within the socket will be of self-lubricating material. This layer of self-lubricating material lining the concave spherical raceway and the insertion slot means is contiguous.

Other features and advantages of the invention will become apparent to those of ordinary skill in the art upon review of the following detailed description, claims, and drawings.

BRIEF DESCRIPTION OF THE DRAWINGS

FIG. 1 is a perspective view of a removable core assembly of a preferred embodiment of the invention exploded to show the component parts.

FIG. 2 is a perspective view of the core assembly of FIG. 1 with the component parts assembled.

FIG. 3 is a cross sectional view of a plurality of core assemblies assembled on a mandrel and showing a partial portion of a sleeve of self-lubricating fabric in position to be slide over the core assemblies.

FIG. 4 is a cross sectional view of the core assemblies of FIG. 3 with the fabric applied over the core assemblies.

FIG. 5 is a cross sectional view of the core assemblies of FIG. 4 with an overlayment built up over the fabric layer.

FIG. 6 is a cross sectional view of the core assemblies of FIG. 5 wherein the outer surface of the overlayment has been finished to a desired configuration.

FIG. 7 is a cross sectional view of the core assemblies of FIG. 6 showing radial plane cutting of the overlayment into individual socket members.

FIG. 8 is a cross sectional view of the core assemblies of FIG. 7 turned axially ninety degrees to show the paths left by the radial plane cutting tool after cutting into the arcuate surfaces of the cylindrical cores.

FIG. 9 is perspective view of a core assembly of FIG. 8 removed from the mandrel with the cylindrical core disassembled from the slots of the spherical cores.

FIG. 10 is perspective view of one of the socket members of FIG. 9 after removal of the spherical core.

FIG. 11 is perspective view of a spherical ball.

FIG. 12 is a perspective view of a ball mounted within the socket of FIG. 10.

FIG. 13 is an end view of a ball and socket of FIG. 11.

FIG. 14 is a cross sectional view taken along line 13—13 in FIG. 12, showing the ball and socket member interface.

FIG. 15 is a perspective view of a removable core assembly of an alternative embodiment exploded to show the component parts.

FIG. 16 is a cross sectional view of the embodiment of FIG. 15 assembled on a mandrel and showing radial plane cutting of an overlayment into individual socket members and the relationship of the cylindrical cores and the cutting tool.

FIG. 17 is a cross sectional view of the assembly of FIG. 16 turned axially ninety degrees to show the paths left by the radial plane cutting tool after cutting to the arcuate surfaces of the cylindrical cores.

DESCRIPTION OF THE PREFERRED EMBODIMENT

Referring to FIGS. 1 and 2, the process of the invention initially comprises providing a removable core assembly 10. FIG. 2 is a perspective view of a preferred removable core assembly 10 disassembled to show the component parts.

The core assembly 10 includes a cylindrical core 12 axially truncated to have opposed flattened surfaces 14 and 16 and opposed arcuate surfaces 18 and 20. The cylindrical core 12 also includes spaced apart ends 22 and 24 and a bore 26. The cylindrical core 12 is preferably of an inexpensive material, as in the preferred process this part is a throw-away component, as will be explained more fully later. Core 12 is most preferably composed of a non-metallic material, such as a synthetic plastic or a resinous composition which is both inexpensive and simple to produce. A preferred cylindrical core 12 comprises a hardened filament wound fiberglass material finished circumferentially to the desired outer arcuate diameter and then further finished tangentially to the axis to flatten the opposed truncated portions 14 and 16.

The core assembly 10 also includes at least one truncated spherical core, or cores 28 and 30, each having a diametrically extending open slot 32 and 34, respectively. The process may be practiced with but a single spherical core 28 or 30 and a cylindrical core 12. A preferred core assembly 10 comprises first and second truncated spherical cores 28 and 30, having opposite ends 36 and 38, and 40 and 42, respectively. The spherical cores 28 and 30 also have respective bores 44 and 46 and spherical external surfaces 48 and 50. The spherical cores 28 and 30 have maximum outer diameters 52 and 54 on the spherical surfaces 48 and 50, and two minimum outer diameters each, 56 and 58 where the ends 36 and 38 and the spherical surface 48 come together on core 28, and minimum outer diameters 60 and 62 where the ends 40 and 42 and the spherical surface 50 come together on core 30.

The open diametrically extending slots 32 and 34 are in facing ends 38 and 40 of respective spherical cores 28 and 30 and are dimensioned to removably receive one of the cylindrical core ends 22 or 24 therein when assembled. The slots 32 and 34 extend axially to the regions of maximum diameter 52 and 54 in respective spherical cores 28 and 30, at diametrically opposed portions of the spherical surfaces 48 and 50. The spherical cores 28 and 30 are intended to be reused, and may be of any suitably rigid material capable of withstanding the processing steps which will be described.

Referring to FIG. 2, the respective ends 38 and 40 of first and second spherical cores 28 and 30 are placed together with a first parting interface 64 therebetween. The spherical cores 28 and 30 are positioned to place their respective slots 32 and 34 in confronting relation to create a double depth slot 66. The double depth slot 66 is dimensioned to removably receive truncated cylindrical cores 12 therein.

Referring to FIGS. 3 through 8, the preferred process utilizes a plurality of such removable core assemblies 10, where each assembly includes axially aligned first and second spherical cores 28 and 30. The plurality of core assemblies 10 are axially aligned relative to one another, with a second parting interface 68 between adjacent assemblies 10. The process will be further described as utilizing such a plurality, although the process steps can be easily adapted for one core assembly having one or two truncated spherical cores.

Referring to FIG. 3, a mandrel 70 is provided and the plurality of core assemblies 10 are mounted on the mandrel 70 in axial alignment with the second parting interface 68 between adjacent core assemblies 10. The core assembly presents an outer surface 72 comprising arcuate surfaces 18 and 20 presented by each cylindrical core 14, and the outer surfaces 48 and 50 presented by the spherical cores 28 and 30, respectively. A parting agent such as a silicone spray 74, is then applied to the core assembly outer surface 72 of the plurality of core assemblies. In the preferred process two layers of parting agent are applied to the core assembly components, the spherical cores 28 and 30 and the cylindrical core 12, prior to assembly on the mandrel 70. Each layer of parting agent is applied to all surfaces by submersing the components in parting agent and subsequently baking the components to fix the parting agent on the surfaces.

A layer of self-lubricating material, or fabric 76 may next be applied over the core assemblies 10 (FIGS. 3 and 4). The self-lubricating fabric 76 may include self-lubricating and shrinkable materials woven together, such as a conformable fabric 76 woven of Teflon and Dacron fibers. The self-lubricating and shrinkable materials may further be woven into a tubular sleeve 78 with the sleeve 78 applied by sliding it axially over the plurality of core assemblies 10. The process may then include the additional step of shrinking the layer 76 of self-lubricating and shrinkable materials after application to the plurality of core assemblies 10.

An overlayment 80 is then applied onto the plurality of core assemblies 10, or over the fabric 76 if previously applied. FIG. 5 shows an overlayment 80 built up over a previously applied layer of fabric 76. The overlayment 80 preferably comprises a plurality of filaments 82 wound under tension, and has an outer surface 84. When the overlayment 80 is applied onto a layer of self-lubricating material 76, it causes the fabric 76 to conform to the core assemblies 10. The tension of winding filaments forces the fabric 76 into a tightly conforming fit to the outer surface 72 of the core assembly 10. Depending upon the winding angle, the layer of self-lubricating fabric 76 applied over each of the first and second parting interfaces 64 and 68 may not be forced to fully conform, that is it may bridge to some degree creating voids 86 and 88 at the first and second interfaces 64 and 68 of adjacent spherical cores 30 and 28.

A hardenable liquid, or resin 90 is applied to coat and bond the overlayment 80 and fill any interstices that exist. The filaments 82 and resin 90 can be applied simultaneously, or the filaments 82 and hardenable resin 90 can applied together, such as by passing the filaments 82 through a reservoir 92 of resin 90. A process for applying fabric and a resin-impregnated overlayment to spherical bearings assembled on a mandrel is disclosed in U.S. Pat. Nos. 3,700,295 and 3,974,009, both issued to Butzow et al., on Oct. 24, 1972 and Aug. 10, 1976, respectively, the teachings of which are disclosed herein by reference.

The hardenable liquid resin 90 applied to the overlayment 80 coats and bonds not just the overlayment 80 but also the layer of self-lubricating fabric 76. The tension also forces the resin 90 to penetrate and fill the interstices that exist between fibers of the fabric 76.

The hardenable resin 90 is then cured, or hardened to form a unitary member 94 including the plurality of axially aligned core assemblies 10.

Excess overlayment 80 is then removed from the unitary member 94 at the overlayment outer surface 84 to provide the unitary member with a finished periphery such as a cylindrical outer periphery 96 and ends 98, only one of which is shown in FIG. 6. The outer periphery 96 may be finished by machining, such as by milling or grinding the unitary member 94, either prior to or after removal of the mandrel 70.

Referring to FIG. 7, radial plane cutting of the elongated unitary member 94 at the first and second parting interfaces 64 and 68 is used to separate the elongated unitary member 94 into a plurality of individual sockets 100 and 102 with the first and second spherical cores 28 and 30, respectively still with the sockets. More specifically, a cutting tool 104 may be used to cut to a depth sufficient to part the fabric 76. The depth of the overlayment 80, and thus the depth of the fabric 76 within the unitary member 94, will vary with the contours in the surface 72 formed by the core assembly 10. Radial plane cutting may occur either before or after removing the unitary member 94 from the mandrel 70.

FIGS. 7 and 8 view the same unitary member 94 with integrated core assemblies 10 rotated about their axis ninety degrees, to show the varying depths of the overlayment 80 and the degree to which the radial plane cutting tool 104 must cut in order to completely sever the fabric 76. The depth of the overlayment 80 at the first parting interface 64 of the core assemblies 10 varies, and is much smaller at the arcuate portions 18 and 20 of the cylindrical core 12 than where the minimum diameters 32 and 34 of the spherical cores 28 and 30 come together over the truncated portions 14 and 16 of the cylindrical core 12. As a consequence of this, in severing the fabric 76 overlying the first parting interface 64 between spherical cores 28 and 30 it will be necessary to cut into the cylindrical core 12 to a depth substantially sufficient to enable the cutting tool to approach minimum outer diameters 56, 58, 60 or 62. This means that a notch 106 will be cut into the cylindrical core 12 of each core assembly 10 to this depth in severing the fabric 76, and it is thus contemplated that the cylindrical core 12 be a throw-away component. If the arcuate surfaces 18 and 20 of the cylindrical core 12 are not damaged beyond the notch 106 formed by the cutting tool 104, the cylindrical core 12 may be reused. In subsequent winding operations the notch 106 will fill with resin 90 which will harden during curing and be removed in subsequent radial plane cutting.

The radial plane cutting tool 104 should be configured so as not to contact the spherical cores 28 and 30, if the latter are to be reused. The cutting tool 104 and first parting interface 64 may be dimensioned so as to allow the cutting tool 104 to pass through the interface 64 without cutting spherical cores 28 or 30. This is easily accomplished by making the distance between ends 22 and 24 on the cylindrical core 12 slightly greater than the length of the double depth slot 66. Adjacent ends 38 and 40 of spherical cores 28 and 30, respectively, are thereby separated by a distance equal to the difference in the length of the cylindrical core 12 and the double depth slot 66.

The cutting tool 104 should, additionally, only approach, but not cut into, the second parting interface 68, to avoid damaging the spherical cores 28 and 30 at ends 32 and 36. In the embodiment wherein fabric has been applied over the core assemblies, the cutting tool 104 preferably passes through the overlayment 80, through fabric 76 and into the voids 86 and 88 at each of the first and second parting interfaces 64 and 68, without contacting the spherical cores 28 and 30. Alternatively, the depth of cut may be controlled to cut only into but not through the fabric 76. Then a second cutting tool, not shown, that is too soft to damage the spherical cores can be utilized to finish severing the fabric 76 at the interfaces 64 and 68.

If the severing step is performed prior to removal of the unitary member 94 from the mandrel 70, the mandrel 70 may be used as an arbor for both the step of providing a finished periphery 96 and radial plane cutting.

Referring to FIG. 9, after radial plane cutting the unitary member 94 is separated into pairs of individual sockets 100 and 102 each still containing a spherical core 28 or 30 with a core 12 therebetween. When utilizing a plurality of core assemblies 10 the process produces a series of pairs of replaceable sockets, such as sockets 100, 102, each socket surrounding a spherical core. Each pair of sockets 100, 102 is slid axially off of the mandrel 70, with the cores 28, 30 and 12 therein. Each pair of sockets 100, 102 are then separated to permit removal of the cylindrical core 12 leaving individual sockets 100 and 102 which are identical. For the sake of simplicity further discussion will refer only to socket 102 that surrounds spherical core 30, mindful that identical operations are followed and described structures found relative to the socket 100 which surrounds spherical core 28.

Referring to FIGS. 9 and 10, when the cylindrical core 12 is withdrawn axially from the slot 34 in the spherical core 30 the insertion slot means 108 is exposed in the socket 102. The insertion slot means 108 comprises two installation slots 110 and 112 diametrically spaced apart on the socket 102. The spherical core 30 within socket 102 is rotated 90° and withdrawn edgewise through the insertion slot means 108, exposing a concave internal raceway 114 in the socket, best shown in FIG. 10.

The resulting replaceable socket 102 is ready for immediate use and requires no further finishing. The replaceable socket 102 has an axis 116, axially spaced sides 118 and 120 and an axially extending bore 122 extending between the axial sides 118 and 120. The internal raceway 114 faces into the bore 122.

The internal raceway 114 is formed over and conforms to the spherical surface 50 of the spherical core 30. The internal raceway 114 thus has a circumferential region of maximum diameter 124 formed adjacent to the maximum outer diameter 54 at the center of the spherical surface 50 of the spherical core 30. The diameter of the internal raceway 114 diminishes in either axial direction to opposed circumferential regions of minimum diameter 126 and 128 at the socket sides 118 and 120 respectively, formed adjacent to the two minimum outer diameters 60 and 62 of the spherical core 30.

The installation slots 110 and 112 are formed over and conform to the opposed arcuate surfaces 18 and 20 of the cylindrical core 12. The installation slots 110 and 112 are separated by a distance at least as great as the region of maximum diameter 124 in the internal raceway 114 and each extends axially from the side 118 into the internal raceway 102 and terminates adjacent the circumferential region of maximum diameter 124. The size of the cylindrical core 12 thus dictates the size of the insertion slot means 108 formed in the socket.

A spherical bearing or ball 130, FIG. 11, is typically mounted within the internal raceway 114, forming a removable ball and socket bearing 132 (FIGS. 12 through 14). The ball 130 is free to move and to rotate within the internal raceway 114. The ball 130 is preferably machined from a suitable steel alloy having such resistance to wear and corrosion as may be required. The ball 130 is typically provided with a central cylindrical bore 134 for receiving a shaft, not shown, of whatever part the bearing 132 is to be mounted on. The ball 130 is also provided with axially spaced, flat, circular end faces 136 and 138. A spherical surface 140 extends between the end faces 136 and 138 and forms the bearing surface of the ball 130. The spherical surface 140 is ground to the required final dimension before insertion into the internal raceway 114 and the spherical surface 140 may be anodized or electroplated to achieve a desired level of surface finish. The ball 130 is free to misalign or to rotate within the socket 102 with spherical surface 140 in contact with the internal raceway 114.

The ball 130 may alternatively be produced of a fiberglass material, and the central bore 134 may optionally include a bearing surface comprising a layer of self-lubricating material 142 integrally bonded thereto. The ball 130 may also have its spherical surface 140 formed by a liner of self-lubricating material 144 integrally bonded thereto, produced by a method disclosed in our co-pending application titled "METHOD OF BONDING SELF-LUBRICATING FIBERS TO AN EXTERNAL SURFACE OF A SUBSTRATUM", filed on Aug. 26, 1992, and assigned to assignee hereof, and which is incorporated herein by reference. The method, not shown, briefly comprises the steps of forming a substratum to provide an external surface thereon of desired configuration and applying a layer of self-lubricating material onto the surface. A plurality of filaments are applied on the layer of self-lubricating material to form an overlayment thereon to exert a bonding pressure sufficient to cause the layer of self-lubricating material to conform and bond to the configured external surface. A hardenable liquid resin is applied prior to, simultaneously with, or subsequent to the application of the self-lubricating material and filaments to coat the material and filaments and fill any interstices that exist. This resin is hardened, after which all or part of the overlayment is removed to expose the layer of self-lubricating material or portions thereof on the external surface.

The socket internal raceway 114 is conformed to the spherical surface 48 of the spherical core 30, and so the internal raceway 114 is dimensioned as needed by simply utilizing a spherical core 30 with a spherical surface 48 in conformity with the spherical surface 140 on the ball 130 to be installed in the socket 102. As the insertion slot means 108 is formed concomitantly with the socket 102, there is no additional processing necessary to fashion the installation slots 110 and 112. The size and conformation of the internal raceway 114 is thus retained without any disruption or disturbance from machining slots into the raceway 114.

As shown in FIGS. 10 through 13, the ball 130 is installed into a socket 102. The ball 130 has an installation axis 146 extending transversely to the axis 116 of the socket 102. The width across the axially spaced ball end faces 136 and 138 is slightly less than the width of the installation slots 110 and 112, which permits the ball 130 to be orientated about the installation axis 146 and inserted edgewise into the insertion slot means 108 and then turned 90° about the installation axis 146 to seat the spherical ball surface 140 in the concave internal raceway 114 of the socket 102, thereby installing the ball 130 within the socket 102.

The ball 130 can similarly be removed from the socket 102 by simply turning the ball 130 ninety degrees (90°) about the installation axis 146 to align the ball end faces 136 and 138 with the insertion slot means 108 and then sliding the ball 130 away from the socket 102 along the socket axis 116. After the ball 130 has been placed into the insertion slot means 108 and turned into the internal raceway 114 ninety degrees (90°) the ball 130 is ready to support a load as soon as a shaft, not shown, is assembled into the cylindrical ball bore 134.

When the layer of conformable self-lubricating fabric 76, such as Teflon, is applied onto the removable core assembly 10 prior to application of the overlayment 80, the installation slots 136 and 138 and the internal raceway 114 of the socket 102 will form a continuous self-lubricating bearing surface 148. The fabric 76 on the internal raceway 114 and the installation slots 136 and 138 is seamless, which results in the socket 102 having a contiguous, self-lubricating internal bearing surface 148. The installation slots 136 and 138 are produced in the socket without machining, and so the fabric 76 remains on the installation slots 136 and 138 in the final socket 102. The process produces no frayed fabric or ground edges in the concave internal raceway. An unbroken, tightly-toleranced low friction surface 148 is thus maintained on the internal raceway 114.

FIGS. 15 through 17 depict an alternative core assembly 150, with cylindrical cores 152 and 154, similar to, but only half as long as, the cylindrical core 12 depicted in FIGS. 1 through 9. The cylindrical cores 152 and 154 have opposed flattened surfaces 156 and 158, and 160 and 162, opposed arcuate surfaces 164 and 166, and 168 and 170, spaced apart ends 172 and 174, and 176 and 178, and bores 180 and 182.

The alternative core assembly 150 also includes truncated spherical cores identical to cores 28 and 30. For the sake of simplicity the numbers used to describe these and other identical components in describing FIGS. 1 through 9 will be utilized in describing the alternative core assemblies in FIGS. 15 through 17. In the alternative embodiment depicted in FIGS. 15 through 17, the open diametrically extending slots 32 and 34 of spherical cores 28 and 30 are each dimensioned to removably receive a cylindrical core 152 or 154 therein.

The alternative core assembly 150 also comprises first and second spacers 184 and 186, which separate adjacent spherical cores 28 and 30 at the first and second interfaces 64 and 68, respectively. Each spacer 184 and 186 has opposite ends 188 and 190, and 192 and 194, respectively, and outer cylindrical surfaces 196 and 198, respectively.

Referring to FIGS. 16 and 17, where plural alternative core assemblies 150 are shown assembled on a mandrel 70, it can be seen that the respective ends 38 and 40 of first and second spherical cores 28 and 30 are placed adjacent the first assembly spacer 184. The first spacer 184 also separates adjacent cylindrical cores 152 and 154 between respective ends 174 and 176. It is best that spherical cores 28 and 30 be positioned to place slots 32 and 34 in aligned and confronting relation, to avoid creating an irregular surface such as would arise if either of arcuate surfaces 164 or 168 of the cylindrical cores 152 and 154 were aligned with a minimum outer diameter 56, 58, 60 or 62 of first or second spherical cores 28 or 30. The double depth slot 66 of the embodiment of FIGS. 1 through 9 is essentially maintained in the alternative embodiment of FIGS. 15 through 17, only rather that being dimensioned to removably receive a large cylindrical core 12 therein, slot 66 receives the first spacer 184 and two smaller cylindrical cores 152 and 154.

Second spacer 186 separates first and second spherical cores 28 and 30, with respective ends 36 and 42 of adjacent spherical cores placed adjacent ends 192 and 194 respectively of spacer 186. It is not necessary that second spacer 186 be used when first spacer 184 is used, and, alternatively, a core assembly may comprise second spacer 186 but with the cylindrical core 12 of FIGS. 1 through 9, and so second spacer 186 may be used without first spacer 184.

FIGS. 16 and 17 depict radial plane cutting by cutting tool 104 for the alternative core assembly depicted in FIG. 15. The cutting tool 104 cuts through the overlayment 80 and up to the outer spacer surfaces 196 and 198 of spacers 184 and 186. The fabric 76 can be nearly completely severed by having the cutting tool 104 closely approximate the outer spacer surfaces 194 and 196, to about 0.0001 of an inch, with only minimal further cutting necessary, such as by a razor knife, not shown. In this case the cutting tool does not encounter the spacers 184 and 186 and the spacer 184 and 186 may be reused. In such a case the spacers 184 and 186 can be produced of a durable or expensive material, for instance a corrosion resistant metal such as stainless steel.

Alternatively, the spacers 184 and 186 can be throw away components, produced of low cost materials such as molded synthetic plastics or filament wound material. In this case the spacers 184 and 186 can be cut into during radial plane cutting without damaging the cutting tool 104.

The spacers 184 and 186 can also be dimensioned having a width equal to the width of the cutting tool 104, so that the cutting tool 104 will align only with the spacers 184 and 186 and not with the spherical core surfaces 48 and 50 or the cylindrical core arcuate surfaces 152 and 154 during radial plane cutting. The cutting tool 104 will thus pass between adjacent ends of the spherical cores 28 and 30 and the paths of radial plane cutting will not pass into the surfaces 48 and 50 of spherical cores 28 and 30 or arcuate surfaces 164, 166, 168 and 170 of alternative cylindrical cores 152 and 154. In this manner the cylindrical cores 152 and 154 and the spherical cores 28 and 30 will have increased life and can be reused, and the spherical cores 28 and 30 and the cylindrical cores 152 and 154 can be produced of a durable material. A preferred alternative core assembly 150 has spacers 184 and 186 made of a synthetic, low cost material which is soft relative to the cutting tool 104, while the spherical cores 28 and 30 and the cylindrical cores 152 and 154 are of stainless steel.

The socket produced by the process utilizing the alternative core assembly 150 is identical to the socket 102 of the embodiment utilizing the core assembly 10 with cylindrical core 12.

A simple and inexpensive method is thus provided which results in a strong, lightweight and inexpensive socket 102. When produced having an internal bearing surface 148 of self-lubricating material, the socket 102 gives increased life to both the socket 102 and whatever ball 130 is inserted therein. The socket 102 may be replaced as necessary, and a relatively expensive long life ball 130 can be advantageously utilized, as the ball 130 can be reused and not replaced with every change of the relatively inexpensive fiberglass socket 102. Although one embodiment of the present invention has been illustrated and described, it will be apparent to those skilled in the art that various changes and modifications may be made therein without departing from the spirit of the invention or from the scope of the appended claims.

What is claimed is:

1. A bearing apparatus comprising
   a spherical bearing, and
   a replaceable socket including a body portion, said body portion including a concave internal raceway engaged by said spherical bearing, and insertion slot means to allow installation and removal of said spherical bearing, said replaceable socket being made by providing a removable core assembly that includes opposed arcuate surfaces conforming to said insertion slot means and a spherical surface in conformity with said concave internal raceway; applying a layer of self-lubricating material over the removable core assembly and shrinking the layer of self-lubricating material to conform it to the removable core assembly so that said self-lubricating material forms a continuous seamless liner for said concave internal raceway and said insertion slot means; applying an overlayment onto said layer of self-lubricating material and applying a hardenable liquid to coat and bond said overlayment and fill any interstices that exist; hardening said liquid to form a unitary body portion of said replaceable socket, said body portion being bonded to said layer of self-lubricating material; removing excess overlayment from said body portion to provide said replaceable socket with a finished periphery and finished ends; and withdrawing the core assembly from said replaceable socket to expose said lined concave internal raceway and said lined insertion slot means.

2. The replaceable socket of claim 1 wherein said overlayment comprises a plurality of filaments wound under tension over said core assembly.

3. A replaceable socket for use with a spherical bearing, said replaceable socket comprising
   a body portion including a concave internal raceway, and insertion slots to allow installation and removal of a spherical bearing, and
   a layer of self-lubricating material lining both said concave internal raceway and said insertion slots, said layer of self-lubricating material being applied over a removable core assembly having an exterior surface with portions conforming to said concave internal raceway and said insertion slots so that said layer of self-lubricating material forms a continuous, uniform and seamless lining.

4. A replaceable socket as set forth in claim 3 wherein said body portion is formed of an overlayment of filaments wound under tension around said layer of self-lubricating material, and resin to fill any interstices between said filaments and to integrally bond said overlayment to said layer of self-lubricating material.

5. A replaceable socket as set forth in claim 4 wherein said self-lubricating material is shrunk onto the removable core assembly after said self-lubricating material is applied thereto so that said concave internal raceway and insertion slots conform to the removable core assembly and so that said replaceable socket is ready for use after removal of the removable core assembly without further finishing operations.

6. A bearing apparatus comprising
   a ball member, and
   a socket member receiving said ball member, said socket member including a concave internal raceway, and diametrically opposed slots to allow insertion and removal of said ball member into said socket member, said socket member being made by applying a layer of self-lubricating material over a removable core assembly having surfaces corresponding to said concave internal raceway and said slots to form a liner including a molded outer lining surface covering both said concave internal raceway and said insertion slots, winding filaments around the layer of self-lubricating material and applying a hardenable resin over the filaments to form a body portion of said socket member that is integrally bonded to said liner and withdrawing the removable core assembly to expose said concave internal raceway and said slots.

7. A bearing apparatus as set forth in claim 6 wherein said body portion includes axially spaced apart sides, wherein said concave internal raceway extends between said axially spaced apart sides of said body portion, and said insertion slots extend from one of said axially spaced apart sides of said body portion, and wherein said molded outer lining surface extends between said axially spaced apart sides to cover the entireties of said concave internal raceway and said insertion slots.

8. A bearing apparatus as set forth in claim 7 wherein said molded outer lining surface has continuous, uniform and seamless surface finish.

9. A bearing apparatus as set forth in claim 8 wherein said surface finish extends over the entirety of said molded outer lining surface.

10. A replaceable socket for use with a spherical bearing, said replaceable socket comprising a body portion including a concave internal raceway, and insertion slots to allow installation and removal of a spherical bearing, said body portion being made of a filament reinforced plastic material, and a layer of self-lubricating material lining both said concave internal raceway and said-insertion slots, said layer of self-lubricating material including a molded outer lining surface extending over said concave internal raceway and said insertion slots.

11. A replaceable socket as set forth in claim 10 wherein said filament reinforced plastic material includes an overlayment of filaments wound under tension around said layer of self-lubricating material, and resin to fill any interstices between said filaments and to integrally bond said overlayment to said layer of self-lubricating material.

12. A replaceable socket as set forth in claim 10 wherein said molded outer lining surface extends over the entireties of said concave internal raceway and said insertion slots.

13. A replaceable socket as set forth in claim 12 wherein said body portion includes axially spaced apart sides, said molded outer lining surface extending between said axially spaced apart sides.

14. A replaceable socket as set forth in claim 13 wherein said molded outer lining surface has a continuous, homogenous surface finish over the entireties of said concave internal raceway and said insertion slots.

15. A replaceable socket as set forth in claim 10 wherein said body portion includes axially spaced apart sides, wherein said concave internal raceway extends between said axially spaced apart sides of said body portion, and said insertion slots extend from one of said axially spaced apart sides of said body portion, and wherein said molded outer lining surface extends between said axially spaced apart sides to cover the entireties of said concave internal raceway and said insertion slots.

16. A replaceable socket as set forth in claim 15 wherein said molded outer lining surface has a continuous, homogenous surface finish over its entirety.

17. A replaceable socket as set forth in claim 10 wherein said molded outer lining surface is continuous, uniform and seamless and extends over the entireties of said concave internal raceway and said insertion slots.

* * * * *